United States Patent [19]

Roth

[11] 4,278,333
[45] Jul. 14, 1981

[54] CAMERA WITH ACTION INDICATOR

[75] Inventor: Johann Roth, Schwabhausen, Fed. Rep. of Germany

[73] Assignee: Braun Aktiengesellschaft, Frankfurt am Main, Fed. Rep. of Germany

[21] Appl. No.: 102,851

[22] Filed: Dec. 12, 1979

[30] Foreign Application Priority Data

Dec. 14, 1978 [DE] Fed. Rep. of Germany ....... 2853942

[51] Int. Cl.³ .............................................. G03B 1/60
[52] U.S. Cl. .................................... 352/170; 116/213
[58] Field of Search ................. 352/170, 171; 116/213

[56] References Cited

U.S. PATENT DOCUMENTS

| 3,205,507 | 9/1965 | Hochstein | 352/171 |
| 3,519,340 | 7/1970 | Vockenhuber et al. | 352/171 |
| 3,784,292 | 1/1974 | Winkler et al. | 352/170 |
| 4,105,310 | 8/1978 | Hirata, et al. | 352/171 |

Primary Examiner—Monroe H. Hayes
Attorney, Agent, or Firm—Michael J. Striker

[57] ABSTRACT

A camera, particularly a motion-picture camera, has an action-light at its front side which becomes energized only when the camera shutter is closed.

11 Claims, 2 Drawing Figures

CAMERA WITH ACTION INDICATOR

BACKGROUND OF THE INVENTION

1. Field of the Invention

This invention relates to cameras in general.

More particularly, the invention relates to motion-picture cameras.

Still more specifically, the present invention relates to motion-picture cameras with an "action" indicator.

2. The Prior Art

Motion-picture cameras with action indicators are known. These indicators are usually in form of a light (known as an "Action-Light") which is mounted at the front side of the camera and is so constructed as to be permanently energized while the camera is running. The purpose of these indicators is to let persons being photographed, know that the camera is in operation. An analogous example of this which everyone knows, is the "ready light" on television cameras.

The continuous energization of the action light while the camera is in operation, is of no particular consequence in large studio-type cameras which are connected to net current for their electrical power supply. However, in the case of battery-operated cameras the relatively high current use resulting from the continuous energization of the light constitutes a disadvantageous drain on the batteries.

Another disadvantage of the known action-lights resides in the fact that light reflexes resulting from operation of the light may be recorded on the motion-picture film. In this context it must be remembered that the known action-lights are energized continuously while the camera is in operation, i.e., while scenes are being filmed, so that such light reflexes may very well be photographed.

Finally, a third disadvantage exists—which is a result of the prior-art efforts to ameliorate the first two mentioned above; namely, in an effort to reduce current drain and light reflexes the known action lights on battery-operated cameras have been made relatively weak, so that there is a distinct possibility that the person or persons being photographed may not know that the light is energized and may therefore be unaware that the camera is running.

SUMMARY OF THE INVENTION

It is a general object of the invention to overcome the disadvantages of the prior art.

A more particular object is to provide a camera action indicator (e.g., action-light) which requires much less electrical current than those of the prior art.

Another object is to provide such an indicator as mentioned above, which cannot produce light reflexes that may be reproduced on film during operation of the associated camera.

Still a further object is to provide an indicator of the type mentioned above, which is always readily discernible by the person or persons being photographed.

In keeping with these objects, and still others which will become apparent hereafter, one aspect of the invention resides in a camera having a shutter. Briefly, stated, the invention may comprise a light-source viewable at least from the front of the camera; an electrical circuit connecting the light source with a source of energy; and means cooperating with a movable camera-mechanism component, for completing the electrical circuit only when the camera shutter is in closed position.

The action-light in a camera using the invention will evidently not be steadily energized while the camera operates, but will be intermittently energized so that the light blinks. Since a blinking light attracts attention much more strongly than a steady light, the action-light according to the invention is considerably more noticeable than those according to the prior art.

Moreover, the mean energization time of an intermittently operating action-light according to the invention is equal to only about 20% of the energization time of a steady light. In other words: the light according to the invention draws much less current that those according to the prior art and, therefore, significantly increases battery life.

The problem of light reflexes being captured on the film is avoided because the action-light according to the invention is energized only while the camera shutter is in closed position, and becomes de-energized when the shutter opens.

A particularly advantageous construction is obtained if the action-light is energized not with every film frame (i.e., every time the shutter closes), but only with every second, fourth ( $\triangleq$ approx. $\frac{1}{4}$ sec.), ninth ( $\triangleq$ $\frac{1}{2}$ sec.) or eighteenth ( $\triangleq$ 1 sec.) film frame. This reduces the battery drain even further and, due to the less frequent blinking action, attracts even more attention than blinking at a 1:1 rate with the shutter.

According to another advantageous embodiment, the light source of the action-light may be arranged in the camera objective. This assures that during filming the action-light will not be obscured by a hand of the camera operator or by e.g., a sunshade mounted on the objective, and thus become invisible to the person or persons being photographed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
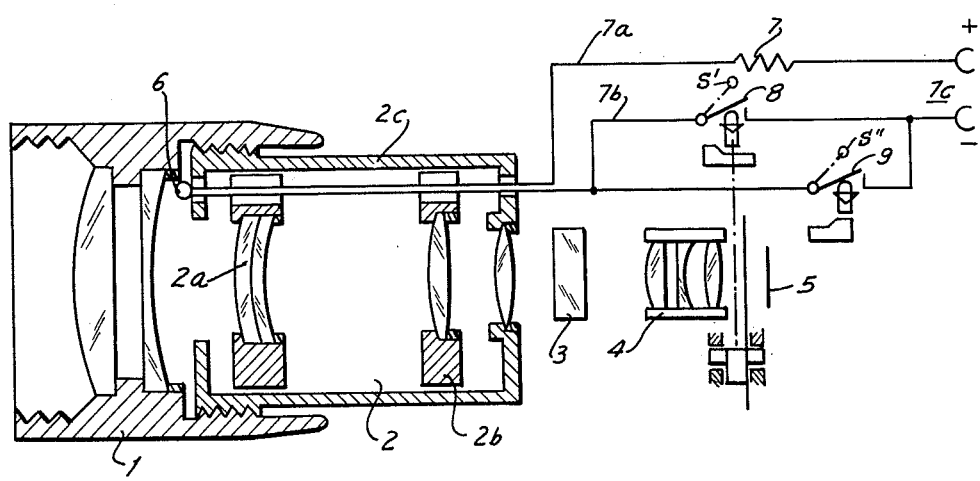
FIG. 1 is a vertical section through the objective of a camera embodying the invention and also showing the associated electrical circuit.

One embodiment of the invention is illustrated in FIG. 1. The camera and its mechanism are omitted because they are known per se. Only the camera objective is illustrated, in form of a zoom-lens objective having a zooming member 1, a zoom lens 2 with lens elements 2a and 2b which are shiftable in the tubular housing 2c, a beam splitter 3 and a base lens 4. The objective is arranged so as to be spaced at an appropriate distance from the plane of a film 5.

A light source 6 is mounted on the housing 2c; in the illustrated embodiment the source 6 is a light-emitting diode (LED). A different type of light source could of course be used, but the use of an LED has the advantage that on de-energization and subsequent opening of the camera shutter there will be no light-source afterglow, which could produce light reflexes to be captured on the film.

An electrical supply circuit 7 for the LED 6 includes two conductors 7a, 7b which are connected to the camera source 7c of electrical energy (e.g., replaceable or rechargeable batteries). The conductors 7a, 7b are shown to extend from the LED 6 through apertures in housing 2c into the interior of the camera (not shown), but they could evidently be conducted into the camera interior in some other manner. Interposed in the circuit 7 is a switch 8, the operational indicator switch, which is coupled in a manner known per se with parts of the camera mechanism, a cam moving with the main film drive shaft SW'. The arrangement is such that the shaft or other camera mechanism part moves the switch 8 to closed (energizing) position only when the camera shutter (not shown) is closed. This means that the LED 6 becomes energized and blinks at the same frequency as the film transport. This is a particularly simple structural solution, but of course other ways are also possible for controlling the energization of the LED 6 (or other light source) as a function of the state (open or closed) of the camera shutter.

Human beings make mistakes, and camera-users are no exception. It may happen, therefore, that the camera is being operated without film in it, or continues to operate after the film in it has been used up (i.e., exposed). In either of these instances the action-light would continue to blink since it is controlled as a function of the shutter state. Persons being photographed would therefore continue to believe themselves "on camera" despite the fact that no exposures are being made.

To avoid this, a further switch 9 is interposed in the circuit 7 in parallel with the switch 8. The switch 9 is so connected with an appropriate element of the camera mechanism (diagrammatically shown as S"), such as the film counter, the film-advancing claw, the film take-up or the film indicator in the film window, that when the film end is reached (or no film is present at all), the switch 9 will be closed by the respective element. This bridges (bypasses) the switch 8 and permanently energizes the source 6. Since the previous blinking of the source thus turns to a steady illumination, viewers are alerted to the fact that although the camera continues to run (as discernible from the camera noises), no film is being exposed.

Figure 2:
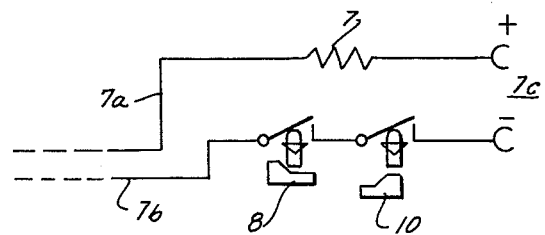
FIG. 2 shows a different circuit for use in lieu of the one in FIG. 1.

A slightly different circuit is shown in FIG. 2, for use in lieu of the circuit shown in FIG. 1. The switch 9 of the circuit in FIG. 1 is here replaced with a switch 10 which is so positioned in the circuit 7 as to be connected in series with the switch 8. The switch 10 is again coupled with one of the film mechanism elements symbolized by S" and will be opened thereby when the film ends (or if no film is present in the camera). When the switch 10 is thus opened the circuit is interrupted; consequently the source 6 cannot be energized even if the switch 8 is closed. In this embodiment, therefore, it is the de-energization (extinguishing) of the source 6 while the camera is running, which shows that the film has come to an end or that there is no film present in the camera at all.

The information conveyed by the action-light 6 is available to the person or persons being filmed, who can have an eye on the camera. It is, of course, desirable to make this same information also available to the camera operator, especially information with respect to the film-end having been reached and the total absence of film in the camera. For this purpose it is advantageous to locate the source 6 in the manner shown in FIG. 1, i.e. in the objective and at such a location that it is visible in the camera viewfinder, at least when the source is energized. The source 6 should then, of course, preferably be so arranged that its light radiates not only forwardly (outwardly) of the objective, but also inwardly into the camera. This presents no problem with respect to the film, because the shutter will be closed (and protect the film) when the source is energized and will be open only when the source is de-energized.

Many cameras have self-timers to e.g. permit the operator to join the scene to be photographed before the self-timer commences operation of the camera. If such a device is present in the camera, then the circuit may additionally be controlled by this device. This permits the person or persons to be apprised of exactly when the self-timer starts the operation of the camera. In other words: while the source 6 is not energized (or alternatively while it is continuously energized) the self-timer is known to be running but the camera is not filming; when the source then starts blinking this indicates that filming has started.

While the invention has been illustrated and described as embodied in a motion-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera having a shutter, particularly a motion-picture camera, a combination comprising a picture-taking objective including lens means; a light-source mounted in said objective and viewable through said lens means at least from the front of the camera; an electrical circuit connecting said light source with a source of energy; and means cooperating with a movable camera-mechanism component, for completing said electrical circuit only when the camera shutter is in closed position.

2. A combination as defined in claim 1, said means comprising a normally open switch interposed in said circuit and the movable component being a main film-advancing shaft, so that the light-source is energized and de-energized with a frequency corresponding to the frequency of film advancing steps.

3. A combination as defined in claim 1, wherein said light-source is a light-emitting diode.

4. A combination as defined in claim 1, said means comprising a first switch in said circuit; and further comprising a second switch also in said circuit in parallel with said first switch and cooperating with at least one camera component responsive to the absence of film at such component, so as to be closed when such component detects the absence of film.

5. A combination as defined in claim 1, said means comprising a first switch in said circuit; and further comprising a second switch in said circuit in series with said first switch and cooperating with at least one camera component responsive to the absence of film at such component, so as to be opened when such component detects the absence of film.

6. A combination as defined in claims 4 or 5, wherein the camera component with which said second switch cooperates is a film-footage counter.

7. A combination as defined in claims 4 or 5, wherein the camera component with which said second switch cooperates is a film-advancing claw.

8. A combination as defined in claims 4 or 5, wherein the camera component with which said second switch cooperates is a film take-up element.

9. A combination as defined in claims 4 or 5, wherein the camera component with which said second switch cooperates is a film-footage indicator visible in the viewfinder.

10. A combination as defined in claim 1, wherein the means is operated by the camera component only after a predetermined number of film exposures.

11. A combination as defined in claim 1, the camera having a self-timer; and wherein said circuit is operatively connected with said self-timer so as to become permanently energized or remain de-energized while the camera is stopped, and to become intermittently energized when the self-timer triggers the operation of the camera.

* * * * *